(12) United States Patent
Philipp

(10) Patent No.: US 10,435,251 B2
(45) Date of Patent: Oct. 8, 2019

(54) CLEANING METHOD AND DEVICE FOR BELT BUFFERS

(71) Applicant: ROTZINGER AG, Kaiseraugst (CH)

(72) Inventor: Kurt Philipp, Grenzach-Wyhlen (DE)

(73) Assignee: Rotzinger AG, Kaiseraugst (CH)

( * ) Notice: Subject to any disclaimer, the term of this patent is extended or adjusted under 35 U.S.C. 154(b) by 0 days.

(21) Appl. No.: 15/774,176

(22) PCT Filed: Oct. 25, 2016

(86) PCT No.: PCT/EP2016/075617
§ 371 (c)(1),
(2) Date: May 7, 2018

(87) PCT Pub. No.: WO2017/080809
PCT Pub. Date: May 18, 2017

(65) Prior Publication Data
US 2018/0327194 A1    Nov. 15, 2018

(30) Foreign Application Priority Data

Nov. 12, 2015 (CH) ........................ 1646/15

(51) Int. Cl.
| | |
|---|---|
| *B65G 45/22* | (2006.01) |
| *B65G 45/24* | (2006.01) |
| *B08B 3/02* | (2006.01) |
| *B65G 47/51* | (2006.01) |

(52) U.S. Cl.
CPC ............ *B65G 45/24* (2013.01); *B08B 3/022* (2013.01); *B65G 45/22* (2013.01); *B08B 2203/0229* (2013.01); *B08B 2230/01* (2013.01); *B65G 47/5104* (2013.01); *B65G 2207/26* (2013.01)

(58) Field of Classification Search
None
See application file for complete search history.

(56) References Cited

U.S. PATENT DOCUMENTS

| | | | |
|---|---|---|---|
| 2,881,463 A | 4/1959 | Vogel | |
| 3,935,610 A * | 2/1976 | Vogt | ...................... B65G 45/22 15/21.1 |
| 5,067,192 A | 11/1991 | Guelfi et al. | |

(Continued)

FOREIGN PATENT DOCUMENTS

| | | |
|---|---|---|
| DE | 10 2012 003 947 A1 | 8/2013 |
| EP | 0 771 745 A1 | 5/1997 |

(Continued)

OTHER PUBLICATIONS

International Search Report dated Feb. 8, 2017 in PCT/EP2016/075617 filed Oct. 25, 2016.

*Primary Examiner* — Kavel Singh
(74) *Attorney, Agent, or Firm* — Oblon, McClelland, Maier & Neustadt, L.L.P.

(57) ABSTRACT

In order to clean the webs in a belt buffer having a plurality of belts arranged one above the other, a cleaning medium is applied to a running belt by means of a cleaning device and vacuumed off together with the loosened contamination. A device for carrying out this cleaning has a cleaning head for applying and vacuuming off the cleaning medium and a device for adjusting the height of the cleaning head to the level of the web to be cleaned and to move the cleaning head over the web to be cleaned.

7 Claims, 2 Drawing Sheets

(56) References Cited

U.S. PATENT DOCUMENTS

| | | | |
|---|---|---|---|
| 5,555,598 A | 9/1996 | Grave et al. | |
| 6,244,423 B1 | 6/2001 | Tacchi et al. | |
| 7,617,562 B2 * | 11/2009 | Schmidt | B08B 5/026 |
| | | | 134/37 |
| 7,784,476 B2 * | 8/2010 | Handy | B08B 1/008 |
| | | | 134/129 |
| 2015/0158677 A1 | 6/2015 | Philipp et al. | |

FOREIGN PATENT DOCUMENTS

| | | |
|---|---|---|
| EP | 0 970 760 A2 | 1/2000 |
| NL | 1019434 C2 | 6/2003 |

* cited by examiner

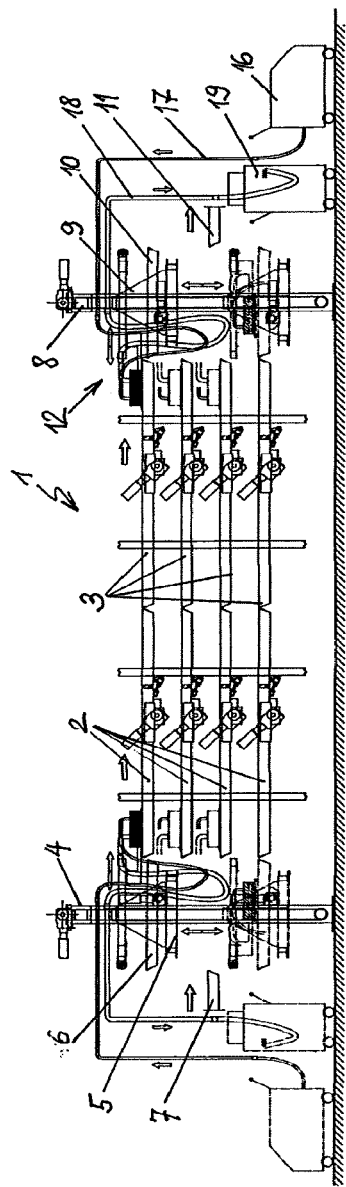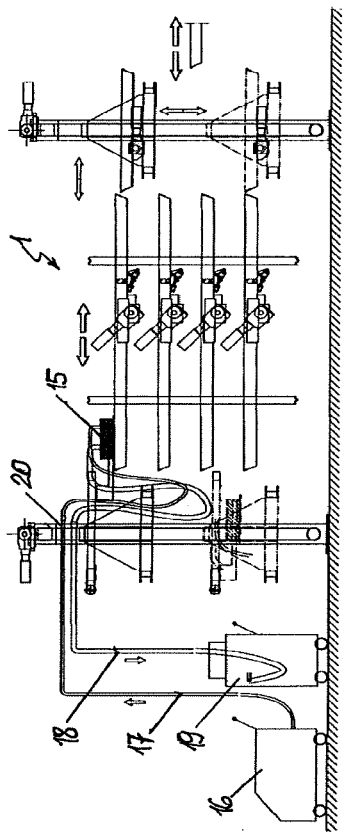

CLEANING METHOD AND DEVICE FOR BELT BUFFERS

The invention relates to a method for cleaning the webs of belt buffers according to the pre-characterizing clause of claim 1 and to a device for carrying out the method.

In food production, buffer devices are usually also used between production and packaging to enable these processes to be decoupled and therefore the efficiency of these lines to be increased. As a result, product loss, which can occur due to stops in the packaging area, can be prevented. Belt storage sections or buffers, in which a plurality of levels of conveyor belts are arranged one above the other, on which freshly produced products can be temporarily stored, are also used for this purpose. These buffer belts also serve as cooling sections, e.g. for biscuits which come hot from the oven. Such combined buffer and cooling sections can be up to 300 m long. The belt width can be up to 2,000 mm; in exceptional cases even more. In order to save space, these belt sections are frequently arranged above head height and are therefore difficult to access. Belt buffers formed from belts arranged one above the other can, for example, be up to 6,000 mm high.

As the handling of naked products is usually involved here, these belt sections must be frequently cleaned, as either they become highly contaminated or have to be systematically cleaned anyway when changing product. These cleaning operations often take a long time, as large sections and therefore large web areas have to be cleaned, often also in inaccessible space conditions. In the time taken for cleaning, the system concerned is not available for production. As cleaning is often carried out by hand, it is time and personnel intensive and is thus expensive.

The invention is therefore based on the object of simplifying and improving the cleaning of multi-layer belt buffers.

According to the invention, this is achieved by the characterizing features of claims 1 and 4. Preferred exemplary embodiments of the invention are described below with reference to the attached drawings. In the drawings:

FIG. 1 shows a side view of a typical belt buffer fitted with cleaning devices,

FIG. 3 shows a side view of a belt buffer with product feed and unloading on one side.

Figure 2:
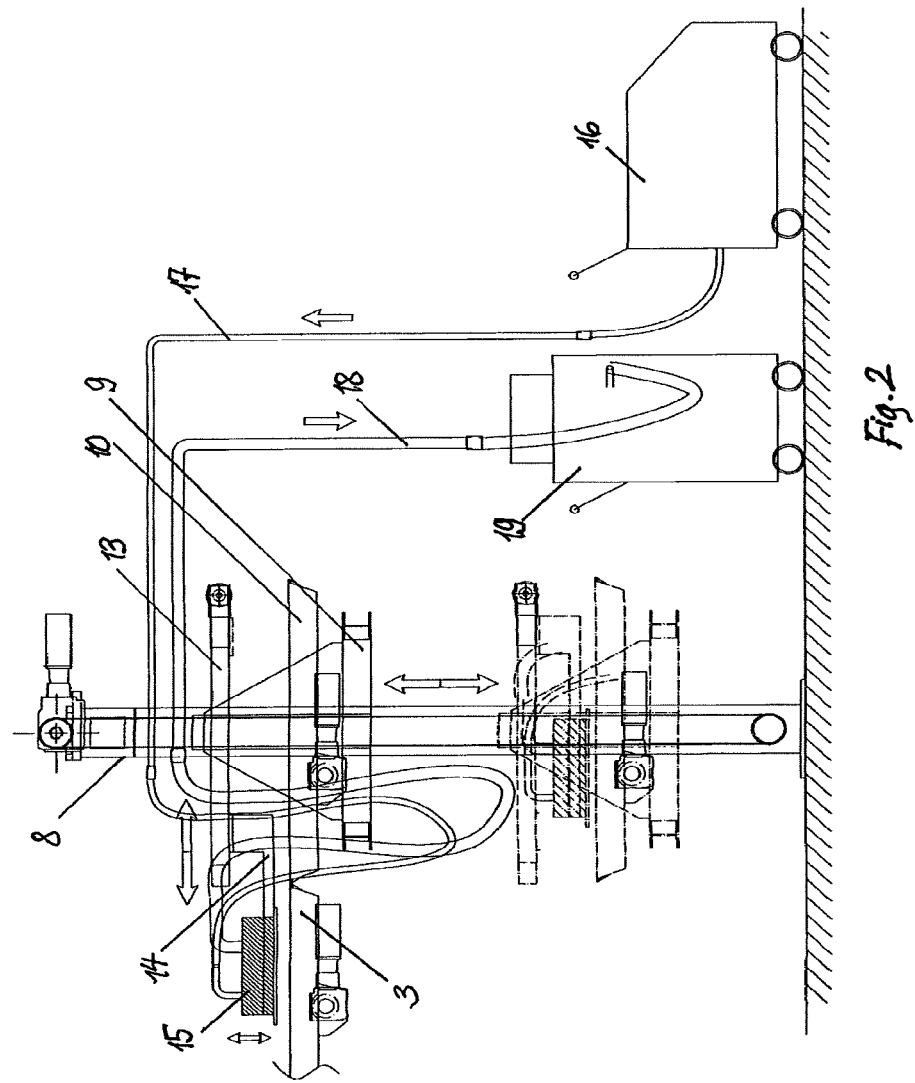
FIG. 2 shows an enlarged view of the discharge area of the belt buffer according to FIG. 1.

The belt buffer 1 shown in FIG. 1 comprises four belt sections arranged one above the other, which for their part each consist of an entry-side conveyor belt 2 and an exit-side conveyor belt 3 arranged thereafter. The product enters via an elevator 4 with a vertically moving slide 5, on which a transfer belt 6 is arranged. The elevator receives the products arriving on a feed belt 7 on its transfer belt, which is subsequently brought to one of the different levels of the belt buffer where the freshly produced product is moved onto the appropriate entry-side conveyor belt of the intermediate buffer. The elevator can also have a plurality of transfer belts.

Likewise located at the exit of the belt buffer is an identically built elevator 8 with a slide 9, which, with a transfer belt 10, receives the products from the belt levels at high level and delivers them to a packaging line 11.

A cleaning device 12 is mounted on each of the slides 5, 9 of the two elevators. Design and function of these two cleaning devices are identical, as a result of which only one, namely the exit-side, cleaning device is described below.

As can be seen more clearly from the enlarged view of FIG. 2, a pair of supporting rails 13, in which a supporting arm 14 driven by servo motors can be moved, is arranged on the slide 9 above the belt 10 extending in the belt travel direction. A cleaning head 15 of a cleaning unit, which is known per se, is arranged at the ends of the supporting arm. The cleaning head can also be adjusted vertically.

The cleaning head has two chambers. In the entry-side chamber, a cleaning medium, preferably steam, is applied to the web surface by means of nozzles. Dirt on the web surface is efficiently loosened by pressure and temperature. The loosened dirt is vacuumed off with the water in the exit-side chamber.

The web surface remains dry and no water is discharged to the surrounding structure.

The cleaning unit with cleaning head 15, steam generator 16, steam feed pipe 17, vacuum pipe 18 and suction unit 19 is a commercially available industrial system and is therefore not described in detail here. Steam generator and suction unit can be mobile or positioned permanently by the system.

In order to clean an empty belt, in the situation shown in FIG. 2 the uppermost conveyor belt 3, the slide 9 is raised to the level of this belt and the supporting arm 14 extended so that the cleaning head 15 passes over the belt where it is lowered onto the belt. When the cleaning head is located on the web, the belt drive, and at the same time the cleaning head, are switched on. After the belt has run through one or more times, the web is clean and the cleaning process is complete. The cleaning head is retracted and moved to a different cleaning position.

As shown at the bottom of FIG. 2, in its retracted position, the cleaning head 15 can also be lowered onto the transfer belt 10 in order to clean it.

For cleaning the other belt levels, the cleaning head is inserted between the belt levels in order to be positioned on the appropriate web surface.

For cleaning, a cleaning mode, in which the particular conveyor belt to be cleaned is run at a defined speed, is incorporated in the system controller. In this way, each belt level of the belt buffer can be approached and cleaned via the elevator.

It is also possible to clean the entry-side belts of the belt buffer independently of the exit-side belts of the belt buffer and vice versa. When both cleaning units are operated in cleaning mode simultaneously, the cleaning duration is halved.

It is therefore possible to clean a multi-layer belt buffer while it is operating (production). For this purpose, certain belt levels are emptied in a defined manner so as to be available for cleaning. After a belt level has been cleaned, it is once more available for refilling. In this way, the conveyor webs of a multi-layer belt buffer can be cleaned in a defined manner, e.g. to accept a new product format, while the remaining belt levels are still being emptied and cleaned. This enables a so-called flying product change.

The belt buffer shown in FIG. 3 works in reversing mode, i.e. the conveyor belts which lie above one another are filled with product from the entry side and the product is also delivered once more from the same side. The belt buffer therefore works according to the "first-in/last-out" principle. With this arrangement, a cleaning device of the same type is arranged on the side opposite the entry/exit with an elevator 20 provided for the purpose.

If the belt buffer has more than two belts arranged one after the other on each of its levels and the middle belts can therefore not be cleaned from the entry or exit side, the cleaning head of an appropriate cleaning device can also be moved onto the respective webs from the side by means of an elevator arranged at the side of the belt buffer.

The use of water is reduced compared with conventional manual cleaning. Furthermore, it is possible to carry out cleaning during production in an automated manner and to significantly reduce changeover times by means of a flying product change.

The invention claimed is:

1. A cleaning method for a belt buffer having a plurality of individual endless belts arranged on a plurality of levels one above the other, comprising:
   causing an elevator device to elevate a cleaning device to a selected level of any belt among the belts to be cleaned;
   causing a side moving device to laterally move the cleaning device onto a surface of the belt to be cleaned; and
   with the cleaning device, applying a cleaning medium onto the surface of the belt that is running and subsequently sucking off the cleaning medium together with loosened contamination.

2. The cleaning method according to claim 1, wherein the cleaning medium is hot steam.

3. The cleaning method according to claim 1, wherein cleaning of individual empty belt sections of the belt buffer is carried out while other belt sections are productive.

4. The cleaning method according to claim 1, wherein the causing the elevator device to elevate the cleaning device includes the cleaning device being movable between the plurality of levels at which the plurality of belts are arranged.

5. A belt buffer comprising:
   a plurality of individual endless belts arranged on a plurality of levels one above the other; and
   a cleaning device with a cleaning head to apply and vacuum off a cleaning medium onto one of the plurality of belts,
   the cleaning device comprising an elevator device to adjust a height of the cleaning head to a level, among the plurality of levels, of a web of the one of the plurality of belts to be cleaned, and a side moving device to move the cleaning head over the web to be cleaned.

6. The belt buffer according to claim 5, wherein the side moving device to move the cleaning head over the web is mounted on a slide of the elevator device to fill and empty the belt buffer and is brought to the level of the web to be cleaned by the slide.

7. The belt buffer according to claim 5, wherein the cleaning head is movable between the plurality of levels at which the plurality of belts are arranged.

* * * * *